(12) United States Patent
El-Sakkout et al.

(10) Patent No.: US 7,693,061 B2
(45) Date of Patent: Apr. 6, 2010

(54) DATA NETWORKING

(75) Inventors: Hani El-Sakkout, Sudbury, MA (US);
Vassilis Liatsos, Boxborough, MA (US);
Stefano Novello, Concord, MA (US)

(73) Assignee: Cisco Technology, Inc., San Jose, CA (US)

( * ) Notice: Subject to any disclaimer, the term of this patent is extended or adjusted under 35 U.S.C. 154(b) by 567 days.

(21) Appl. No.: 10/548,997

(22) PCT Filed: Apr. 2, 2004

(86) PCT No.: PCT/GB2004/001487

§ 371 (c)(1),
(2), (4) Date: Sep. 9, 2005

(87) PCT Pub. No.: WO2004/088918

PCT Pub. Date: Oct. 14, 2004

(65) Prior Publication Data

US 2006/0171316 A1 Aug. 3, 2006

(30) Foreign Application Priority Data

Apr. 2, 2003 (GB) ................................. 0307638.7

(51) Int. Cl.
*G01R 31/08* (2006.01)
*H04J 3/02* (2006.01)
*G06F 15/173* (2006.01)
(52) U.S. Cl. ........................ 370/235; 370/238; 370/462; 370/395.32; 709/241
(58) Field of Classification Search ................ 370/238, 370/238.1, 235, 351–356, 395.32, 468, 395.41, 370/395.43, 395.62, 462, 395.5; 709/238–241
See application file for complete search history.

(56) References Cited

U.S. PATENT DOCUMENTS 6,018,524 A 1/2000 Turner et al.

(Continued)

FOREIGN PATENT DOCUMENTS

EP 1089517 4/2001

(Continued)

OTHER PUBLICATIONS

Shigang Chen, Klara Nahrstedt, "Distributed Quality of Service Routing in High Speed Networkd Based on Selective Probing", 1999, Entire Document.*

(Continued)

*Primary Examiner*—Kwang B Yao
*Assistant Examiner*—Candal Elpenord
(74) *Attorney, Agent, or Firm*—Cindy Kaplan

(57) ABSTRACT

There is provided a traffic placement method in a communications network, the communications network comprising a plurality of nodes, the nodes being connected to one another by links, the method comprising selecting a (possibly non-strict) subset from a given set of traffic flow demands and calculating a plurality of paths for the selected demands under consideration of a set of constraints using an algorithm hybridization combining backtrack search with local consistency techniques (BT+CS) and guiding search by the use of one or more probe generators, that is, search techniques that solve a routing sub-problem or an arbitrary relaxation of the traffic placement problem. By using a hybrid algorithm that integrates other solvers (search techniques) into BT+CS through the use of probe generators, a more powerful search strategy can be achieved compared to BT+CS or the individual search techniques.

47 Claims, 5 Drawing Sheets

U.S. PATENT DOCUMENTS

| | | | |
|---|---|---|---|
| 6,310,883 B1* | 10/2001 | Mann et al. | 370/408 |
| 6,538,991 B1 | 3/2003 | Kodialam et al. | |
| 6,804,199 B1* | 10/2004 | Kelly et al. | 370/238 |
| 6,956,821 B2* | 10/2005 | Szviatovszki et al. | 370/237 |
| 6,963,927 B1* | 11/2005 | Lee et al. | 709/241 |
| 7,065,045 B2* | 6/2006 | Jeffries et al. | 370/230 |
| 7,130,262 B1* | 10/2006 | Cortez et al. | 370/216 |
| 7,280,526 B2* | 10/2007 | Fleischer et al. | 370/351 |
| 7,302,482 B2* | 11/2007 | Rodosek et al. | 709/224 |
| 7,317,684 B2* | 1/2008 | Fodor et al. | 370/231 |
| 7,324,453 B2* | 1/2008 | Wu et al. | 370/238 |
| 7,349,326 B1* | 3/2008 | Zadikian et al. | 370/216 |
| 2002/0089937 A1 | 7/2002 | Venkatachary et al. | |
| 2003/0002444 A1* | 1/2003 | Shin et al. | 370/238 |
| 2003/0011844 A1* | 1/2003 | Park et al. | 359/128 |
| 2003/0185153 A1* | 10/2003 | Kohler et al. | 370/230 |
| 2003/0227877 A1* | 12/2003 | Kar et al. | 370/252 |
| 2005/0008014 A1* | 1/2005 | Mitra et al. | 370/392 |

FOREIGN PATENT DOCUMENTS

| | | |
|---|---|---|
| EP | 1126667 | 8/2001 |
| EP | 1235461 | 8/2002 |
| GB | 2299729 | 10/1996 |
| GB | 2332809 | 6/1999 |
| GB | 2353915 | 3/2001 |
| GB | 2374243 | 10/2002 |

OTHER PUBLICATIONS

Olli Kamarainen, Hani El Sakkout, "Local Probing Applied to Scheduling", Sep. 2002, pp. 155-171.*

Shigang Chen et al., "Distributed Quality-of-Service Routing in High-Speed Networks Based on Selective Probing", Local Computer Networks, 1998, 0-8186-8810-6/98 IEEE.

Olli Kamarainen et al., "Local Probing Applied to Scheduling", Proceedings of the 8$^{th}$ International Conference on the Principles and Practice of Constraint Programming, Sep. 2002.

* cited by examiner

DATA NETWORKING

This application claims benefit of co-pending PCT application PCT/GB2004/001487 filed Apr. 2, 2004, which was published on Oct. 14, 2004, which claims the benefit of GB application No. 0307638.7 filed Apr. 2, 2003. These applications are incorporated by reference in their entireties.

This invention relates to data networking. More particularly, but not exclusively, it relates to systems and methods of selecting traffic demands and determining their paths in a data or communications network.

BACKGROUND

The Internet and communications or data networks in general have become key enablers to a broad range of business, government, and personal activities. More and more, such networks are being used as a general information appliance, business communication tool, entertainment source, and also a substitute for traditional telephone networks and broadcast media.

Traffic placement deals with the selection of, and the routing of customer traffic flows (demands) over a particular physical topology. The issue is, given a set of traffic flow demands that are candidates for placement over the network topology, to select a subset from this set that represents the "placed" traffic demands (i.e. the demands that will be actually carried over the network, which may be the entire given set or some subset) and to compute for the placed demands a set of paths. The selected demands and the paths chosen for them should be such that network utilisation or other network characteristics are optimized, and, in cases where the demands cannot all be satisfactorily placed over the network, such that selection criteria are optimized such as the quantity and/or value of placed traffic. Note that traffic placement enapsulates routing but not vice versa since traffic placement is concerned additionally with the selection of the traffic flows that are routed over the network.

Generally, a communications network consists of nodes and links. A demand is defined by its source and destination node and usually also by a certain bandwidth requirement. Other requirements may include a given maximum path delay or a demand cost penalty that is incurred for not placing the demand, for example. The paths that carry traffic under normal operating conditions are known as "primary paths".

However, traffic placement problems may also incorporate mechanisms that protect traffic against network failures. This involves the calculation of pre-configured backup paths that ensure traffic flows can still be carried over the network in the event of single or multiple link or node failures.

Different schemes for protection using pre-configured backup paths are in existence. For example path protection for a demand involves the computation of an alternative "secondary path" from the demand's source to its destination. The secondary path remains inactive until a network failure occurs that disrupts the demand's primary path, at which point it gets activated. If the secondary path has been calculated to avoid the failed element(s) that caused the primary path to be disrupted, it will be capable of carrying traffic over the network even after the failure, thereby providing protection against this failure scenario. Note that the primary and secondary paths for a given traffic demand are interdependent under path protection schemes, because they need to avoid traversing the same failure-prone elements.

In another class of protection scheme, known as local protection (for example, in MPLS networks detour or fast re-route protection are instances of local protection) traffic is not rerouted from the source to the destination. Instead, when it arrives in the vicinity of the failed element(s), traffic is rerouted locally around the point or points of failure.

Another possible feature of traffic placement, known as "load balancing" involves the calculation of multiple paths for single traffic demands such that the multiple paths collectively carry the demand's required bandwidth over the network. Load balancing can apply in normal and/or failure protection scenarios.

Traffic placement problems are traditionally approached using techniques based on linear programming (LP) such as the Mixed Integer Programming (MIP) techniques, or using Shortest Path First (SPF) or Constraint Shortest Path First (CSPF) based techniques. However, these approaches suffer from several disadvantages and/or limitations.

MIP and other traditional LP-based approaches are impractical for solving the full traffic placement problem, as a large amount of memory is required even for relatively small problems.

As an example, consider a network that has around 700 links. Suppose that 1000 flows are to be placed. To model this using a multicommodity flow model, a variable is needed for each flow on each link. This means 700,000 variables are needed to model just this part of the problem. Alternatively, if a path variable is used to represent each potential route, the size of the problem is even greater. Both these alternative formulations lead to impractically large LP matrices and consequently to an unacceptable memory requirement.

One approach to this problem is column generation, which incrementally expands the LP (variable and constraint) matrix (see C. Barnhart, C. A. Hane, P. H. Vance, "Using Branch-and-Price-and-Cut to solve origin-destination integer multi-commodity flow problems", *Operations Research*, 2000). However, while reducing the severity of this problem column generation continues to suffer from scalability limitations.

Another factor is that MIP and other traditional LP-based approaches are inflexible since they accept only certain classes of constraint. This impedes the extension of the traffic placement model to take into account new requirements.

With respect to SPF & CSPF algorithms, their weakness lies in that they are incomplete and have a low coverage of the search space. This means that, for many problem instances, they will miss acceptable or good quality solutions.

SUMMARY OF THE INVENTION

It is an aim of the present invention to select traffic flows (demands) for placement and determine their paths in communication or data networks. It is a further aim of the present invention to alleviate at least some of the disadvantages mentioned above.

According to one aspect of the present invention, there is provided a method of selecting and routing traffic flow demands in a communications network, the communications network comprising a plurality of nodes, the nodes being connected to one another by links, the method comprising selecting a subset from a given set of traffic flow demands and calculating a plurality of paths for the selected demands under consideration of a set of constraints using an algorithm hybridisation combining backtrack search with local consistency techniques (BT+CS) and probe generation. Accordingly, the search is guided by the use of one or more probe generators. That is, other search techniques are employed that solve a routing sub-problem or solve any other arbitrary relaxation of the traffic placement problem.

By using a hybrid algorithm that integrates other solvers (search techniques) into BT+CS through the use of probe generators, a more powerful search strategy can be achieved compared to BT+CS or the individual solvers. In "probe backtrack" hybridization the complex problem is decomposed into sub-problems. These sub-problems are then solved by integrating into BT+CS other specialised solvers which are individually either not capable of, or not effective at solving the whole problem, but which are suitable and efficient for the particular sub-problems.

In this hybridization technique, BT+CS acts as the master search strategy while the probe generators generate partial solutions (i.e. solutions that are incomplete or that violate some of the constraints) which are used to direct the search and limit the size of the overall search space. Tentative solutions (probes) are created to guide the search and highlight areas where constraints are still violated, or where optimization criteria such as utilization can be improved further. As further search choices are made in an effort to arrive at a feasible or better quality solution, these tentative solutions (probes) are revised by the probe generator(s) to reflect the master BT+CS search choices. A coherent search is achieved by focusing the search on regions where the probe violates at least one of the given set of constraints. Note that these violated constraints may be constraints that are intrinsic to the traffic placement problem instance undergoing solution, or search constraints that are enforced by an optimization procedure to ensure that the algorithm searches for better quality solutions than those already found.

Depending on the BT+CS search choice mechanism, and the properties of the integrated probe generator solver, the search may be made sound and sat-complete (the search algorithm finds a feasible solution or proves no solution exists in a finite number of steps) or sound and opt-complete (it finds an optimal solution or proves no solution exists in a finite number of steps), allowing search coverage to be scaled to suit search coverage and performance requirements.

By using probe backtrack search hybridising local consistency methods and one or more relaxation methods to solve the traffic placement problem, at any point in the search a probe generator may focus on small subsets of the demands and assume that the remaining demands retain their earlier relaxation routes. This improves the scalability characteristic of the search algorithm.

Mixed integer programming; any other techniques based on linear programming; local search techniques; specialised flow algorithms; SPF or CSPF algorithms; or any other suitable algorithm may be used as probe generators and hybridized into BT+CS using probe backtrack search hybridization.

The method can be used for calculating the traffic placement for a set of traffic flow demands and/or for repairing an existing traffic placement solution in scenarios where the demands, topology or constraints are changed. The traffic placement problem may target the selection and routing of primary paths, or backup paths required for a protection scheme, or arbitrary combinations of primary and backup paths under single or multiple protection schemes. For certain classes of protection the protection paths are independent of the primary paths. For example, under a "bandwidth protection" scheme the calculation of local fast re-route backup paths for flows flowing through an element that might fail is independent of the primary paths. For other classes of protection, the primary and backup traffic placement sub-problems are interdependent and are dealt with as part of the same traffic placement problem.

According to another aspect of the present invention, there is provided a method for selecting and routing traffic flow demands in a communications network, the communications network comprising a plurality of nodes, the nodes being connected to one another by links, the method comprising selecting a subset from a given set of traffic flow demands and calculating a plurality of paths for the selected demands under consideration of a set of constraints, wherein the method comprises the steps of (a) dividing the constraints into "hard" and "easy" constraints; (b) obtaining a probe satisfying the "easy" constraints; (c) determining whether the probe violates one or more of the hard constraints; and (d) starting from the probe, searching for one or more solutions satisfying the hard constraints if the probe is determined to violate hard constraints in step (c); and wherein the method employs local consistency techniques.

According to another aspect of the invention, there is provided a method of selecting and routing traffic flow demands in a communications network, the communications network comprising a plurality of nodes, the nodes being connected to one another by links, the method comprising: a) selecting a subset from a given set of traffic flow demands; b) calculating a plurality of paths for the selected demands under consideration of a set of constraints; c) obtaining a tentative solution satisfying a subset of the full set of constraints; d) determining whether the tentative solution violates the full set of constraints; and e) starting from the tentative solution, searching for one or more feasible solutions satisfying the full set of constraints if the tentative solution is determined to violate the full set of constraints in step (d); and wherein local consistency techniques are applied.

According to another aspect of the present invention, there is provided a routing method in a communications network, the communications network comprising a plurality of nodes, the nodes being connected to one another by links, the method comprising selecting a subset from a given set of traffic flow demands and calculating a plurality of paths for the selected demands under consideration of a set of constraints using a backtrack search wherein mixed integer programming, other techniques utilizing linear programming, SPF, or CSPF are used for obtaining a probe, and wherein local consistency techniques are applied.

In this way the complex problem of placing paths such as a primary or backup traffic placement can be approached in an improved way. The search method produces good quality solutions in reasonable time and allows scalability.

The various protection and load balancing schemes described herein may be used separately or combined. Embodiments of the invention are applicable to traffic placement and path calculation in general, and as such can be applied within algorithms that select demands and calculate paths for combinations of primary and backup scenarios under different protection and load balancing schemes. This applies to different application domains including but not limited to MPLS traffic engineering, ATM and optical networks.

Further aspects and advantages of the invention will be appreciated, by example only, from the following description and accompanying drawings, wherein FIG. 1 illustrates a simplified example of an Internet Protocol (IP) network;

A node refers to network devices such as a router, switch or a local network.

The nodes are connected by links, usually via a network cable and/or connecting interface.

The bandwidth of a directed link defines the maximum capacity of traffic that can be transported through this link at any one time.

A path from a source to a destination node is a sequence of linked nodes between the source and destination nodes.

A route is a path between end-to-end internal nodes of a network that follows a given routing protocol.

A traffic flow between external nodes is the traffic load on one specific route between these nodes over a time interval.

A router is an interconnection between network interfaces. It is responsible for the packet forwarding between these interfaces. It also performs some local network management tasks and participates in the operations of the routing protocol The packet forwarding can be defined according to a routing algorithm or from a set of static routes pre-defined in the routing table.

A routing algorithm generates available routes for transporting data traffic between any two nodes of a given network.

Figure 1:
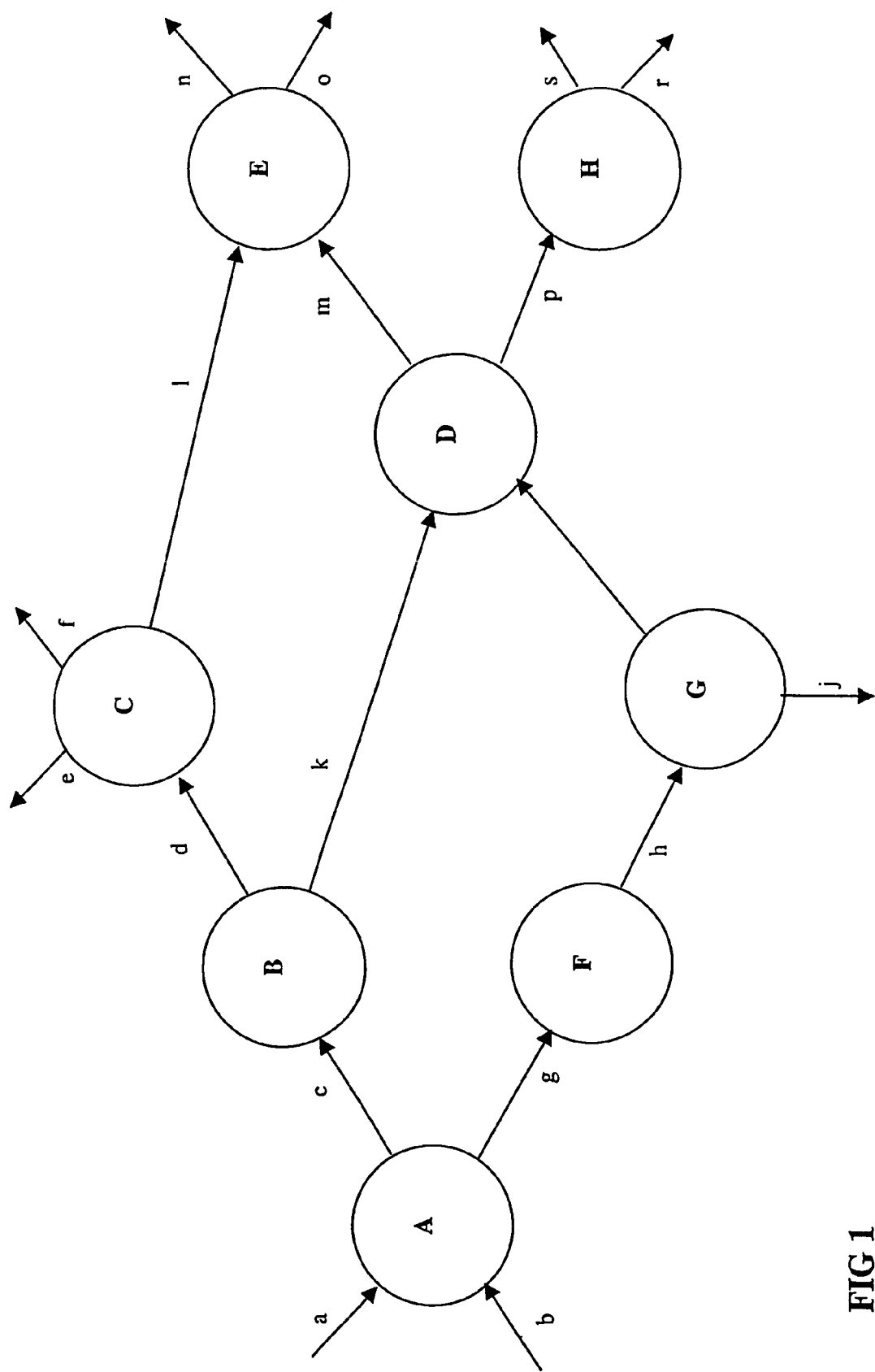
FIG. 1 illustrates a simplified example of an Internet Protocol (IP) network. Generally, such a network consists of nodes and links.

The nodes of FIG. 1 may interoperate in a manner specified by various protocols including, e.g., TCP/IP as known in the art, suitable link layer protocols such as Link Management Protocol (LMP), and protocols like the Multiprotocol Label Switching (MPLS). More details may for example be found in the following documents:

E. Rosen, et al., "Multiprotocol Label Switching Architecture," RFC 3031, Internet Engineering Task Force, January 2001.

Braden, et al. "Resource ReSerVation Protocol (RSVP)—Version 1 Functional Specification," RFC 2205, Internet Engineering Task Force, September 1997.

Awduche, et al., "Requirements for Traffic Engineering Over MPLS," RFC 2702, Internet Engineering Task Force, September 1999.

Ashwood-Smith, et al., "Generalized MPLS Signaling—RSVP-TE Extensions," Internet Draft, Internet Engineering Task Force, October 2001.

Pan, et al., "Fast Reroute Techniques in RSVP-TE," Internet Draft, Internet Engineering Task Force, October 2001.

The contents of the above documents are herein incorporated by reference in their entirety for all purposes.

Multiprotocol Label Switching (MPLS) is a method for forwarding packets through a network. It enables routers at the edge of a network to apply labels to packets. ATM switches or existing routers in the network core can switch packets according to the labels with minimal lookup overhead.

Traffic engineering (TE) relates to techniques and processes used to cause routed traffic to travel through the network on a path other than the one that would have been chosen if standard routing methods had been used.

A tunnel is a secure communication between two peers, such as two routers. A traffic engineering tunnel is a label-switched tunnel that is used for traffic engineering. Such a tunnel is set up through means other than normal Layer 3 routing; it is used to direct traffic over a path different from the one that Layer 3 routing could cause the tunnel to take.

Delay is the time between the initialisation of a transaction by a sender and the first response received by the sender or the time required to move a data packet from the source to the destination over a given path. Certain voice and video applications require delays to be within a certain bound.

Jitter is the interpacket delay variance, i.e. the difference between interpacket arrival and departure. Jitter is an important metric for voice and video applications.

Multiple bandwidth pools: Traffic engineering allows constraint-based routing (CBR). One of the constraints satisfied by CBR is the availability of required bandwidth over a selected path. Traffic engineering may be extended so as to enable performing CBR of "guaranteed" traffic, which satisfies a more restrictive bandwidth constraint than that satisfied by CBR for regular traffic. Generally, this is referred to as multiple bandwidth pool capacity, or alternatively multiple nested bandwidth pool capacity if one bandwidth pool is a part of the other. In MLPS traffic engineering, the more restrictive bandwidth is termed a sub-pool, whereas the regular TE tunnel bandwidth is called the global pool. In the specific algorithm described below, the sub-pool is assumed to be a portion of the global pool. This ability to satisfy a more restrictive bandwidth constraint translates into an ability to achieve higher quality of service performance (in terms of delay, jitter, or loss) for the guaranteed traffic.

The system for calculating traffic paths may be implemented in a network management system.

Figure 2:
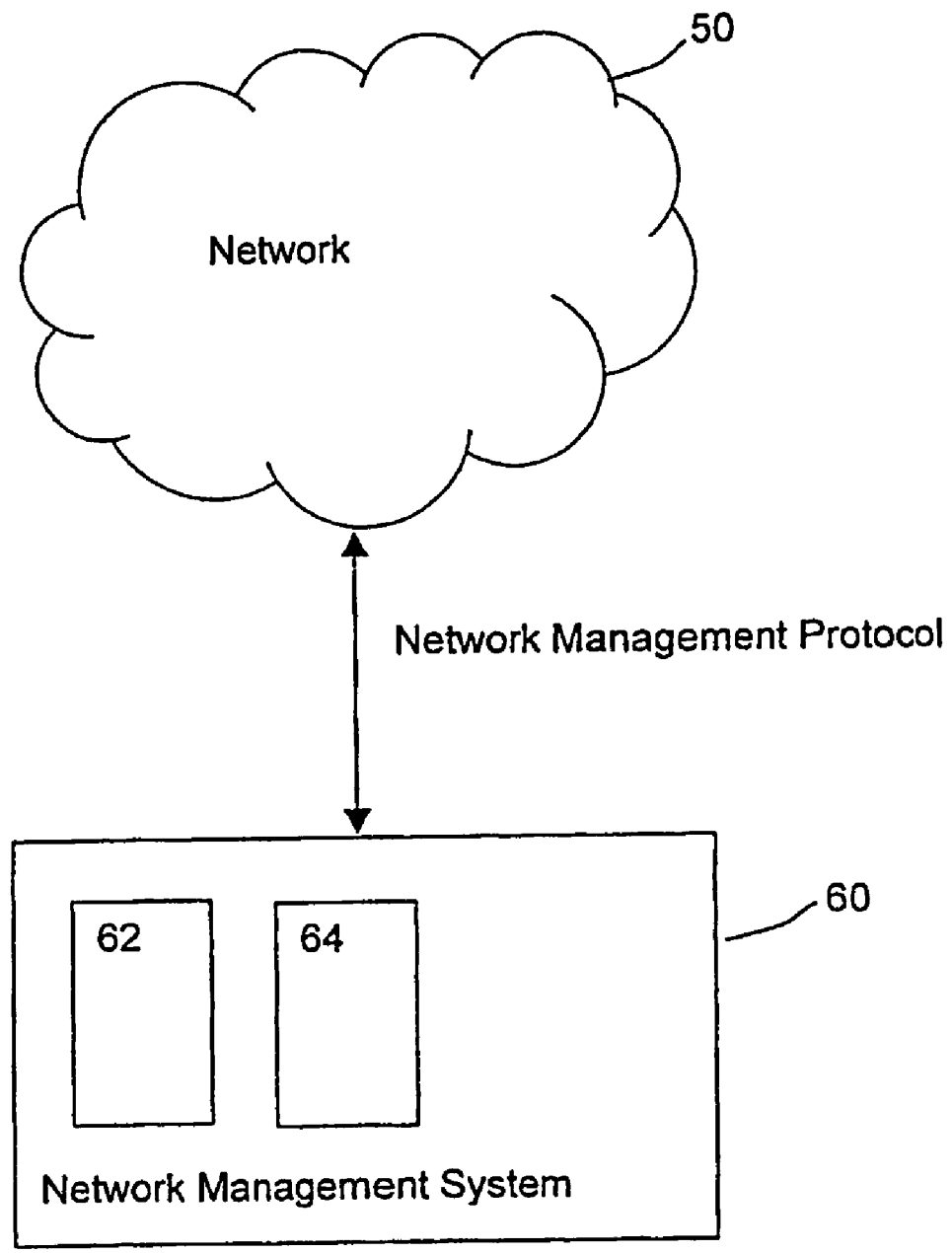
FIG. 2 illustrates the relationship of a network and a network management system, into which the present invention may be implemented.

FIG. 2 illustrates the relationship of the network and a network management system 60 in which the present invention may be implemented. Network management system 60 performs the network management functions for network 50. The network management system communicates with the network using a network management protocol, such as the Simple Network Management Protocol (SNMP). The network management system 60 includes a processor 62 and a memory 64 and may comprise a commercially available server computer. A computer program performing the calculation of paths is stored is memory 64 and can be executed by processor 62.

Alternatively, the system for calculating traffic paths may be implemented in one or more of the routers of the communications.

Traffic Placement Problem

Referring to FIG. 1, the general idea of the present invention will now be described in a simplified way. The network in FIG. 1 consists of nodes A to H and the directed links (or edges) a to s. Each edge is associated with a given bandwidth pool capacity. In addition, each edge might be associated with a given delay and/or a given cost metric.

The task is now to place a set of demands, wherein each demand is defined by its source and destination node. The set of demands in the simplified example may be for instance the placement of a path from node A to E, another path from node A to H and a third path from C to G. Each demand has a given bandwidth requirement, and may also require a maximum delay or a given penalty may be associated with the demand if no path can be generated satisfying the demand.

The problem is now to place the set of demands such that certain constraints are satisfied. In the example the constraint is that, for every edge, the total bandwidth required by the paths using the particular edge does not exceed its given bandwidth pool capacity.

Other constraints may be formulated, such that the demand requires a "link-disjoint" secondary path for path protection, or that no load-balancing is allowed, i.e. that there exists either one path or no path for every demand, or such that the total delay for each demand's path does not exceed the maximum delay requirement.

If more than one possible solution for the problem exists, the "best" solution may be chosen according to some optimisation criteria. The traffic placement problem may for example be solved such that the total penalty due to unplaced demands is minimised.

Alternatively, a weighted or hierarchically structured optimisation function involving multiple criteria may be used. If, for example, more than one solution exists with a minimal penalty cost of unplaced demands, a further optimisation criterion may be used to find the "best solution". For example, the solution with the minimal worst-case (maximum) capacity pool utilisation may be chosen, as a minimal worst-case capacity utilisation ensures that future demands have a better chance of acceptance in the context of the paths found, and that a better quality of the transmission is achieved since traffic travelling over lower utilized links is less likely to suffer from transient congestion.

The traffic placement problem may be extended such that multiple nested pools per link are taken into account. In MPLS traffic engineering, each link may for example be associated with a given "sub-pool" and "global pool" utilisation capacity.

A related problem is to repair a set of existing paths in a new scenario where the constraints, demands or topology have changed. This variation of traffic placement is referred to here as "demand fix".

The decision criterion in this case can be formulated as the minimisation of the amount of perturbation, where perturbation is a measure of network disruption. For example, perturbation might be defined as the number of existing paths that have to be changed in order to find a solution.

The traffic placement problem can thus be formulated by a set of variables V, and for each variable a function D mapping each variable $V_i$ to a set of values $D_i$ also referred to as the variable's domain, and a set of constraint relations C each on a subset of the variables in V.

A solution is an assignment of each variable $V_i$ in V to a value from its corresponding domain $D_i$ such that every constraint in C is satisfied.

The above formulation captures the constraint satisfaction aspect of the traffic placement problem. In addition, an objective function can quantify the quality of the solution, allowing the formulation of an optimisation aspect.

Backtrack Search with Local Consistency

According to one embodiment of the present invention, the traffic placement problem builds on an algorithm combining backtrack search with local consistency techniques.

A backtrack search algorithm (BT) is illustrated by the following pseudo-code.

```
function BacktrackSearch(vars,domains,constraints)
    result:= BacktrackSearch(vars,domains,constraints,{})
    if (SOLUTION(result) then
        return result
    else  return NO_SOLUTION_EXISTS
function BacktrackSearch(vars,domains,constraints,decisions)
    if (NO_SOLUTION(vars,domains,constraints,decisions) or
    SOLUTION (vars,domains,constraints,decisions)) then
        return (vars,domains,constraints,decisions)
    else
        new_decision:= select_bt_decision
        (vars,domains,constraints,decisions)
        decisions':= decisions ∪ {new_decision}
        new_decision_result:= BacktrackSearch
        (vars,domains,constraints,decisions')
        if SOLUTION (new_decision_result) then
            return new_decision_result
```

-continued

```
        else
            decisions":= decisions ∪ {NOT(new_decision)}
            return
            BacktrackSearch(vars,domains,constraints,decisions")
```

Several functions used above are explained below:

SOLUTION(vars, domains, constraints, decisions) returns True if and only if the decisions have constrained every variable to a value and all constraints are satisfied under the assignment (the parameters represent a solution).

NO_SOLUTION(vars, domains, constraints, decisions) returns True if and only if decisions have constrained some variables to take particular values and at least one constraint is violated under the assignment (the parameters do not represent a solution).

Figure 3:
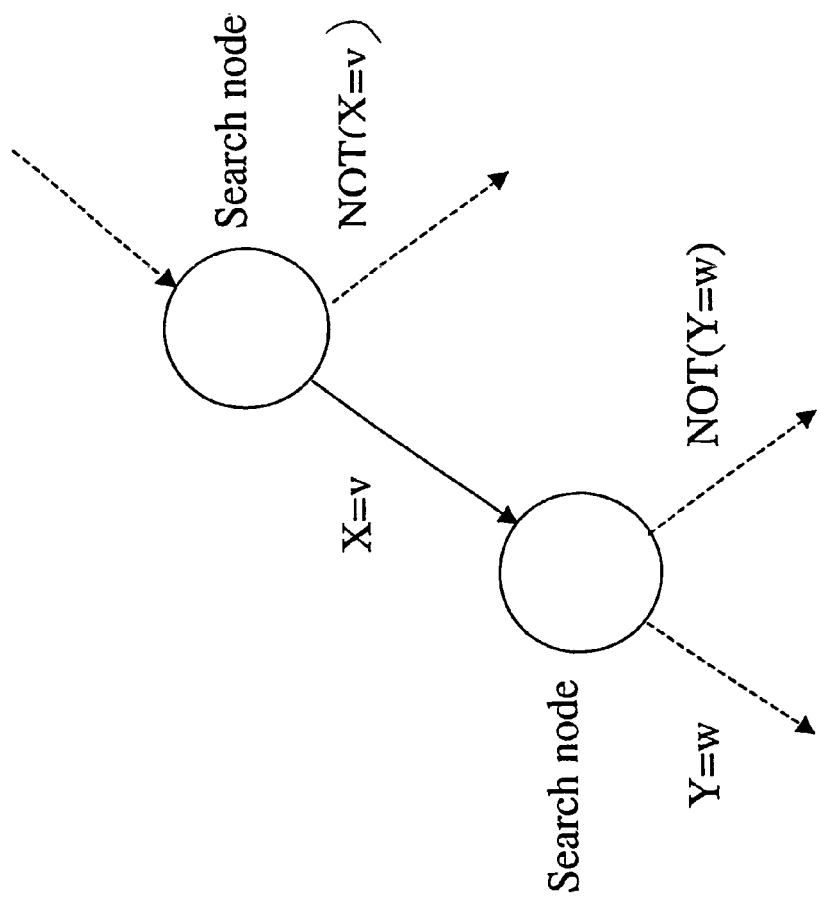
FIG. 3 illustrates in a simplified way a node in the search tree of the backtrack search technique.

Referring now to FIG. 3, a backtrack search is illustrated.

At any backtrack point an unassigned variable X and a value v is selected and the backtrack decision is to constrain the variable to take this value (X=v). On backtracking, the negation of this decision is taken, i.e. NOT(X=v) i.e. (X≠v).

If the domains of the variables are finite, and select_bt_decision covers all possible values for each variable, the search is complete, i.e. it finds a solution if one exists, or proves none exists, in a finite number of steps.

However, the backtrack search framework is more general. As an alternative to assigning a particular value to a variable at each search node (and posting the negation of this assignment on backtracking), other types of constraints can be used at every backtrack point.

For example, Select_bt_decision may post other types of constraint (e.g. X≦Y) and their negations (e.g. X>Y), or other combinations of constraints that partition the search space, provided the search remains "complete".

Local consistency, also referred to as constraint propagation, is a type of "constraint satisfaction" technique.

After a decision is made, local consistency infers some of its consequences, typically by deducing that some values in the variables' domains are no longer consistent with the current set of variables, domains, constraints and decisions. These values can then be eliminated from the search and thus the search space is significantly reduced. The technique is called "local consistency" because at every local consistency step a constraint is considered in the context of the newly restricted domains of its variables, in isolation of the other constraints in the local consistency procedure. The constraint may be used to derive further restrictions on the variables' domains. The process iterates until a "fixpoint" is reached, wherein no more derivations are possible.

The advantages of local consistency techniques are that they can often detect when the problem has become insoluble (e.g. when all the values in a variable's domain have been eliminated) leading to an immediate backtrack, or that they can derive domain restrictions that restrict backtrack search choices. In doing so, they enable backtrack search to avoid futile search branches.

Local consistency techniques are scalable because they execute in polynomial time, and a consistency step for a constraint need be applied only when the domains of one or more of its variables have been restricted by a search decision or derivation.

Combining the local consistency techniques with the backtrack search thus results in an algorithm (BT+CS) that is illustrated in the pseudo-code below.

```
function BacktrackSearchConsist(vars,domains,constraints)
    result:= BacktrackSearchConsist(vars,domains,constraints,{})
    if(SOLUTION (result) then
            return result
    else        return NO_SOLUTION_EXISTS
function BacktrackSearchConsist(vars,domains,constraints,decisions)
    local_consistency_result=local_consistency_proc
    (vars,domains,constraints,decisions)
    if (NO_SOLUTION(local_consistency_result) or
    SOLUTION(local_consistency_result)) then
            return local_consistency_result
    else
            new_decision:= select_bt_decision
            (local_consistency_result)
            decisions':= decisions(local_consistency_result) ∪
            {new_decision}
            new_decision_result:= BacktrackSearchConsist (vars,
            domains, constraints, decisions')
            if SOLUTION(new_decision_result) then
            return new_decision_result
    else
            decisions":= decisions(local_consistency_result) ∪
            {NOT(new_decision)}
            return BacktrackSearchConsist
            (vars,domains,constraints,decisions")
```

Thus, after a variable has been constrained to a value Xi=v, all the constraints on this variable have their local consistency procedures activated, resulting in newly derived constraints of the form Xj≠v. All the constraints on the newly constrained variables Xj will then have their local consistency procedures activated.

The process iterates until no more derivations are possible (a fixpoint has been reached).

Probe Backtrack Search

The search for solutions for the traffic placement problem can further be improved by the usage of "probes" in order to direct the search.

A probe is obtained by considering only a subset of the full set of constraints, or a simplification of some or all of the constraints, i.e. by a so-called relaxation. In this way, a sub-problem is obtained that involves fewer, or looser, constraints, and is more easily soluble.

The sub-problem constraints are also referred to as the relaxation's "easy constraints". If optimisation is applied, its objective function is known as the relaxation's "easy objective function". Constraints and objective functions not in the relaxation are called "hard". A solver for this sub-problem is known as a "prober" or "probe generator". A "hard" constraint can be a complex constraint that is given as input to the problem, or a complex constraint that is posted by an optimization procedure that is restricting the search to find better solutions.

By integrating a probe generator into the above described algorithm, the search procedure can be improved. If the sub-problem at a search node is insoluble, then the overall problem at this search node is insoluble. Accordingly, in the search procedure, the search backtracks the last decision.

If the sub-problem is soluble, the backtrack search size can be reduced because it can focus on repairing any "hard" constraints (and/or objectives) that are violated by "probes" returned by the probe generator.

Repairs are forced by posting a new "easy constraint" to the "probe generator" that ensures that the problematic probe is not returned again. If the "probe generator" finally satisfies the "hard" constraints, a solution has been found.

Below, a pseudocode illustration of probe backtrack (PBT) search is given. This pseudocode assumes a single probe generator.

```
function ProbeBacktrackSearch(vars,domains,constraints)
    result:= ProbeBacktrackSearch(vars,domains,constraints,{})
    if (SOLUTION(result) then
            return result
    else       return NO_SOLUTION_EXISTS
function ProbeBacktrackSearch(vars,domains,constraints,decisions)
    local_consistency_result=local_consistency_proc(vars,domains,constraints,de
    cisions)
    if (NO_SOLUTION (local_consistency_result) or
    (SOLUTION(local_consistency_result))
            then return local_consistency_result
    else
            decisions' := decisions(local_consistency_result)
            relaxation_result:= pbt_prober (pbt_relaxation(vars, domains,
            constraints, decisions'))
            if (NO_SOLUTION(relaxation_result) or (SOLUTION (relaxation_result))
                    then return relaxation_result
            else
                    new_decision:= select_pbt_decision (relaxation_result, vars,
                    domains, constraints, decisions')
                    decisions":= decisions' ∪ {new_decision}
                    new_decision_result:=
                    ProbeBacktrackSearch(vars,domains,constraints,decisions")
                    if SOLUTION(new_decision_result) then
                            return new_decision_result
                    else
                            decisions'" decisions ∪ {NOT(new_decision)}
                            return
                            ProbeBacktrackSearch(vars,domains,constraints,deci
                            sions'")
```

Probe backtracking can be viewed as a generalisation of Mixed Integer Programming (MIP), enhanced with a local consistency component.

In contrast to probe backtracking, MIP has only one type of "easy constraint" (the linear equalities and inequalities) and one type of "hard constraint" (the integrality constraints which restrict integer variables to take integer values). If the problem is subjected to optimisation, there is only one type of relaxation "easy objective function" (i.e. a linear objective function).

Thus, the relaxation in MIP is called a "linear relaxation" of the problem. The probe generator is typically a Simplex linear solver variant.

Probe backtracking as a generalisation of MIP uses local consistency and arbitrary relaxations and probe generators. Any types of "easy constraint", "hard constraint" and, if an optimisation problem is considered, any types of "easy objective function" may be used.

In the pseudo-code, the pbt_relaxation is any relaxation that can be solved efficiently, and the pbt_prober is any efficient technique for solving pbt_relaxation. The function select_pbt_decision is only called if the probe generator succeeded in solving the sub-problem, and the probe returned is not a solution, i.e. at least one "hard constraint" is violated by the probe. Subsequently, a new probe is forced by posting an "easy constraint" that ensures that the violated hard constraint will not be violated again in the same way. On backtracking, the remainder of the search space is considered by posting the negation of this "easy constraint". Additionally, an alternative easy constraint is selected and posted to ensure that the hard constraint will not be violated again in the same way. The easy constraints need to be chosen such that no solutions are ruled out.

Application of the Backtrack Search to the Traffic Placement Problem

It will now be explained how the probe backtrack search technique is applied to the traffic placement problem, for example in the case of MPLS traffic engineering.

According to one embodiment, the traffic placement problem can be expressed as computing a set of paths for given demands according to some optimisation criteria, such that for every edge or directed link the total bandwidth required by the paths using the edge does not exceed its bandwidth pool capacity (or in the case of multiple pools, capacities), and that for every demand there exists either one path or no path for it. Further requirements may be taken into account, for instance the total delay for its path may not exceed its maximum delay requirement. The optimisation criterion may be chosen so as to minimise the total penalty of demands with no paths, for example. Alternatively, a different criterion, or a weighted or hierarchical optimisation function may be used as explained above.

Using the Probe Backtrack Search technique to solve this problem, the probe generator may attempt to find paths for a "narrow" relaxation that comprises a restricted subset of the demands such that the paths satisfy the connectivity and bandwidth constraints for the restricted demand subset. Under the "narrow" relaxation it is assumed that no bandwidth is used by paths associated with demands outside the restricted subset. The probe generator seeks to find a solution to the "narrow" relaxation. A "wide" relaxation that covers the whole set of demands is then found by assigning the new paths obtained by the probe generator to their corresponding demands in the restricted demand subset, while retaining unchanged paths for all the demands outside the restricted set.

If in addition delay or other requirements are imposed, they may be formulated as additional constraints that are dealt with by the probe generator.

According to one embodiment, the probe is based on an MIP probe generator for calculating individual demand paths in the relaxation. The probe does not have to satisfy the "hard constraint" on total available capacity on link bandwidth pool, i.e. it can ignore demands not (re)routed in the "narrow" relaxation.

An advantage of this probe backtrack search algorithm compared to other techniques is that, at every search node in the backtrack search, only a small part of the relaxation problem is reoptimised by the probe generator. This means that a subset of the paths is routed or rerouted using a hybridized solver. In the implementation given in more detail below only one path is rerouted in the process. This is to be contrasted with traditional MIP, and other traditional approaches based on LP solvers that do not apply this hybridization form, where the entire set of demands are addressed by the solver and potentially (re-)routed at every tree search node. A further difference is the application of local consistency techniques at backtrack search nodes.

If the paths so chosen yield a violated capacity constraint on a link pool, a search node is created, and the following three separate search branches are considered in turn by posting new "easy constraints":

(1) Drop the demand, i.e. decide that it will not be routed, and seek to reduce violations further in child search nodes;

(2) On backtracking, require the demand to be placed, but constrain it to be routed away from this link, and seek to reduce violations further in child search nodes;

(3) On backtracking, require the demand to be placed, and require it to be routed through this link, and seek an alternative demand to reduce this violation in child search nodes.

After the selection of the search choice, specialised local consistency techniques are applied for the Traffic Placement problem to derive some of the consequences of the selected search choice. These will be described below. The following is illustrative pseudo-code for solving the traffic placement problem using a probe backtrack search algorithm.

```
function PathCalculation(vars, domains, constraints)
    result := ProbeBacktrackSearch(vars, domains, constraints,
    {}, {})
    if SOLUTION(result) then
        return result
    else
        return NO_SOLUTION_EXISTS
function TPProbeBacktrackSearch(vars, domains, constraints, decisions,
previous_tp_relaxation_result)
    tp_local_consistency_result:=tp_local_consistency_proc(vars,
    domains, constraints, decisions)
    if (NO_SOLUTION(tp_local_consistency_result) or
    (SOLUTION(tp_local_consistency_result))
        then return tp_local_consistency_result
    else
        decisions' := decisions(tp_local_consistency_result)
        tp_relaxation_result:= update_demand_paths
        (vars,domains,constraints,decisions',
        previous_tp_relaxation_result)
        if (NO_SOLUTION(tp_relaxation_result) or
        (SOLUTION(tp_relaxation_result))
            then return tp_relaxation_result
            else new_decision:= tp_volation_repair_decision
        (tp_relaxation_result, vars, domains, constraints, decisions)
            decisions":= decisions' ∪ {new_decision}
            new_decision_result:= TPProbeBacktrackSearch (vars,
```

-continued

```
    domains, constraints, decisions", tp_relaxation_result)
if SOLUTION(new_decision_result) then
    return new_decision_result
else
    decisions''':= decisions ∪ {NOT(new_decision)}
    return TPProbeBacktrackSearch (vars, domains,
        constraints,decisions''', tp_relaxation_result)
```

The function update_demand_paths(vars, domains, constraints, decisions, previous_relaxation_result) represents the probe generator and is called after earlier search and local consistency decisions have made certain demand paths invalid in the "wide" relaxation. For each such demand the probe generator is used to generate a path satisfying both delay and relaxed bandwidth constraints. Recall that the bandwidth constraints are relaxed in the sense that other demands not addressed by the probe generator at this probe backtrack search node are not assumed to consume any bandwidth, i.e. the probe generator is applied only to a "narrow" relaxation consisting of a sub-problem where a selected subset of the demands are (re)routed. This subset should be chosen to ensure that the size of the sub-problem is easily managed by the probe generator. In the simplest case only one demand is rerouted in the "narrow" relaxation, but subsets of arbitrary size may be chosen. After the probe generator obtains new paths for the selected demands, a "wide" relaxation is constructed by allowing the other demands to retain the paths assigned to them in earlier search nodes.

The MIP probe generator that reroutes one demand at a time is described in the following section. The described probe generator is named mip_shortest_path_prober.

If a new path cannot be found for the demand by mip_shortest_path_prober then there are the following two alternatives:

(1) If a demand is "required to be placed" by an earlier search decision or derivation then the algorithm returns no solution and backtracks to the previous choice point; or (2) The algorithm infers that the demand must be dropped, and moves to a new child search node where it is required to be dropped.

If a solution is found mip_shortest_path_probe returns a path for the demand such that the total delay of the path does not exceed the maximum delay for the demand and the bandwidth requirement does not exceed the capacity of any of the edges in the path, i.e. the capacity of the edges in the path is enough to carry the demand, if such a path exists. The path returned minimises hard constraint violations and is optimal with respect to criteria that reflect the chosen objective function.

mip_shortest_path_probe needs to take into account constraints such as required links, i.e. that a path for a given demand must pass through a certain link. This is essential because the probe backtrack search depends on the probe generator respecting search choices that partition the search space into mutually exclusive parts, and that are explored in sequence at the backtrack search level. How the required link constraints are handled for this probe generator will be described in more detail in the following sections.

The function tp_violation_repair_decision focuses the search on repairing a violated hard constraint restricting the capacity of a link bandwidth pool, i.e. a link bandwidth pool where the total required bandwidth exceeds the available, and selects a demand contributing to the violation with the intention of dropping or rerouting it. As described above, the function takes one of the following decisions:

(1) Drop the demand, i.e. decide that it will not be routed;
(2) On backtracking, require the demand to be placed, but constrain it to be routed away from this link bandwidth pool; and
(3) On backtracking, require the demand to be placed, and require it to be routed through this link bandwidth pool.

As will be illustrated in more detail below, specialised local consistency techniques may be applied for the Traffic Placement problem. The method described below applies—in combination with flow conservation constraints—lower bound constraints, minimum cut constraints and cost based constraints. Flow conservation constraints specify that the volume of traffic traversing a node is consistent, i.e. the flow volume into the node is equal to total flow volume out. For lower bound constraints, a lower bound on the volume of traffic that must be used on a bandwidth bool, given earlier search choices and derivations, is derived. For minimum cut constraints, minimum cuts are used to derive upper bound constraints on the maximum bandwidth that can flow between sets of nodes. For cost based constraints, costs from previous feasible solutions are used to constrain the search to return better solutions than those already found. All these derived constraints are incorporated into the local consistency process, enabling the detection of futile search branches throughout the search.

A further aspect of the probe generator is that, in order to ensure scalability of the described method, a re-usable MIP constraint model is used to achieve an efficient use of time and memory. For the re-usable MIP the same flow variables and constraint model (and hence the same LP matrix) are used to represent different demand paths at different search nodes.

Finally, it should be noted that the described algorithm can be configured for many problems to be not only "sat-complete", but "opt-complete", i.e. the algorithm returns an optimal solution or proves that no solution exists in a finite number of steps.

MATHEMATICAL DESCRIPTION OF A SPECIFIC EMBODIMENT

In the following, an embodiment of the probe backtrack search technique to solve the traffic placement problem is described in more detail.

Problem Definition

A specific instance of the Traffic Placement (TP) problem is used to illustrate the technique. For notational simplicity but without loss of generality, several assumptions are made in the instance. However, the method described can be extended straightforwardly to address problems that violate these simplifying assumptions:

1. There are no parallel links in the network (i.e. any two nodes are connected by a maximum of one link).
2. When admitting new demands, no existing demands have already been placed on the network.

The relaxation of assumption (1) simply adds some notational complexity. Relaxing assumption (2) additionally involves factoring into the calculations the bandwidth on each bandwidth pool that is currently used by previously placed demands, which, according to the requirements may or may not be moved or dropped as part of the admission process.

In the traffic placement application, two use cases are targeted: demand admission, i.e. the admission of new traffic demands, and demand fix, the repair of a traffic placement in the context of revised demands, constraints or topology. For the purposes of illustration, nested bandwidth pools have been included (each link is associated with a global pool and a sub-pool, the latter being nested in the former). This demonstrates the application of the technique to multiple bandwidth pools on links, without loss of generality in simpler or more complex bandwidth capacity cases.

In the embodiment, search is made opt-complete for demand admission cases but only sat-complete for demand fix cases for simplicity. However, there is no loss of generality and an opt-complete algorithm could be similarly constructed for demand fix cases.

Problem Input

The Traffic Placement problem input consists of:
A directed graph G=(N, E) where N is a set of nodes and E is a set of edges representing the network.
Each edge (i, j) represents a directed link in the network with head router i and tail router j. Each edge is associated with the following attributes:
Global capacity $g_{ij}$
Subpool capacity $s_{ij}$
Delay $d_{ij}$
A set of traffic demands K.
Each demand k is associated with the following:
Source $s_k$
Destination $t_k$
Requirement $q_k$ (units of bandwidth to be routed from $s_k$ to $t_k$)
Penalty $c_k$ (penalty for not placing demand k)
Maximum delay $d_k$ (maximum delay of the path for k)
Bandwidth Pool $p_k$ (0 if global pool, 1 if sub-pool)
Delay constrained flag $f_k$ (1 if delay constrained, 0 otherwise)
Original path $R_k$
The problem type (demand admission or demand fix)

Problem Variables

Binary Decision Variables

There are three binary [0,1] decision variable types:
$x_{ijk}$
  1, if all of requirement $q_k$ of demand k traverses edge (i,j).
  0, otherwise.
$y_k$
  1, if demand k is placed on the network.
  0, otherwise.
$z_k$
  1, if demand k does not follow its original path.
  0, otherwise.
Note that in demand admission problems the $z_k$ variables are irrelevant and in demand fix problems the $y_k$ variables are decided (all set to 1).

Optimization

Demand Admission

For the demand admission feature the optimization function is a hierarchical one that optimizes on the following criteria (in order of reducing importance):
1. Minimize penalty cost of unplaced demands $$\min \sum_{k \in K} c_k (1 - y_k) \quad (O1)$$

2. Minimize worst case sub-pool utilization min Subutil (O2)
3. Minimize worst case global pool utilization min Globutil (O3)

Demand Fix

For the demand fix feature the objective is different. It is assumed that all the demands must be placed (all $y_k$ variables are set to 1) and the optimization function minimizes the amount of perturbation. This is better suited to customer scenarios where the customer must respond quickly to a network change without disrupting their network. Perturbation is defined as the number of demands that have been rerouted from their original path:

$$\min \sum_{k \in K} z_k \quad (O5)$$

Problem Constraints

Constraints C1 and C2 are pool capacity constraints. They state that the demands using a particular pool cannot exceed the available capacity of this pool. The available capacity of a pool is its original capacity multiplied by the relevant worst-case pool utilization variable, which is constrained in demand admission by the optimization process as it restricts the search to find better solutions.

$$\forall (i, j) \in E \sum_{k \in K} q_k x_{ijk} \leq (Globutil) g_{ij} \quad (C1)$$

$$\forall (i, j) \in E \sum_{k \in K} q_k p_k x_{ijk} \leq (Subutil) s_{ij} \quad (C2)$$

Constraint C3 states that a demand's path cannot exceed its maximum delay if it is a delay constrained demand.

$$\forall k \in K \sum_{(i,j) \in E} d_{ij} f_k x_{ijk} \leq d_k \quad (C3)$$

Constraint C4 states the flow conservation principle. The incoming flow to a node should be equal to the outgoing flow.

$$\forall i \in N, \forall k \in K \sum_{(i,j) \in E} x_{ijk} - \sum_{(j,i) \in E} x_{jik} = b_{ik} \quad (C4)$$

Where
$b_{ik}=y_k$, if $i=s_k$
$b_{ik}=-y_k$, if $i=t_k$
$b_{ik}=0$, otherwise

Constraint C5 states that the demand should be placed if a link is used for it and no link should be used if the demand is not placed.

$$\forall k \in K, \forall (i,j) \in E \; x_{ijk} \leq y_k \quad (C5)$$

Constraint C6 and C7 state the conditions when a demand is not using its original path, i.e. when a demand is rerouted. Constraint C6 states that the demand is rerouted if any of the links of the original path is not used by the demand's path. Constraint C7 states that a demand is also rerouted if any of the links not in the original path is used by the demand's path.

$$\forall (i,j) \in R_k (1 - x_{ijk}) \leq z_k \quad (C6)$$

$$\forall (i,j) \in E \setminus R_k \; x_{ijk} \leq z_k \quad (C7)$$

Problem Size

The number of decision variables for the TP problem is equal to $|K||E|$ for the $x_{ijk}$ variables + $|K|$ for the $y_k$ (or $z_k$) variables in demand admission (fix). Thus, the possible combinations are of the order $O(2^{|K||E|})$. Memory usage may be reduced by mechanisms that are not described here.

Probe Backtrack Search

Recall that Probe Backtrack Search (PBT) is a generic search method involving at least three components: backtrack search, local consistency, and one or more probe generators (relaxation solvers). A probe generator solves a relaxation of the original problem involving constraints that are easy to solve. At each search node the algorithm has a partial solution with possible conflicts (constraint violations). Search repairs conflicts by posting further constraints that are fed into the sub-problem. If there are different ways of repairing a conflict, a backtrack-point is created and alternatives are explored upon failure. Search for a feasible solution terminates when no conflicts exist.

For the TP problem, the "wide" relaxation is the computational sub-problem comprising the routing of all the demands ignoring the capacity constraints (constraints C1 & C2), and a "probe" is a solution to this relaxation. The probe generator is applied to a relaxation of the TP problem and generates a probe known as the tentative solution. The tentative solution may violate the capacity constraints. If no constraint violations exist, the tentative solution is also a solution to the TP problem. As explained previously, for scalability reasons the probe generator may be restricted to reroute a subset of the demands given paths in the current probe, and paths for the other demands not rerouted by the probe generator may be merged in with the newly rerouted paths to create a modified "wide" probe.

Preliminaries

In the rest of this document the following notation is used.

lb(v) refers to the lower bound of the variable v ub(v) refers to the upper bound of the variable v var(v) is true if variable v is not decided yet (neither 0 or 1)

v' refers to the tentative value of the variable v

The Constraint Model

The probe component ignores the bandwidth capacity constraints (C1 and C2). These hard constraints are monitored for conflicts. For scalability reasons these constraints are stated in a slightly different way.

First, the placed variables ($y_k$) are also included in the constraint. This is because constraint (C5) that links the $y_k$ variables with the $x_{ijk}$ variables is not stated in the model.

Thus the new constraints become, $$\forall (i,j) \in E \sum_{k \in K} q_k x_{ijk} y_k \leq (Globutil) g_{ij} \quad (C'1)$$

$$\forall (i,j) \in E \sum_{k \in K} q_k p_k x_{ijk} y_k \leq (Subutil) s_{ij} \quad (C'2)$$

Constraints (C6) and (C7) are also stated in the model.

$$\forall (i,j) \in R_k (1 - x_{ijk}) \leq z_k \quad (C'3a)(\text{Same as C6})$$

$$\forall (i,j) \in E \setminus R_k x_{ijk} \leq z_k \quad (C'3b)(\text{Same as C7})$$

There is a need for a constraint to link the placed variable $y_k$ to the reroute variable $z_k$.

$$\forall k \in K \, z_k \leq y_k \quad (C'4)$$

Also, if local consistency propagation deduces that a demand cannot be rerouted there should be a way of forcing the original path. This is expressed by the following constraint.

$$\forall (i,j) \in R_k (1 - z_k) \leq x_{ijk} \quad (C'5)$$

Finally, to support a possible "demand fix" optimisation process, where the minimum possible number of paths will be rerouted in the optimal solution, a constraint is introduced to limit the maximum number of reroutes. MaxZ is a variable that is constrained as the search progresses to restrict the number of demands that are along a path that is different from their input path.

$$MaxZ \geq \sum_k z_k \quad (C'6)$$

It is noted, however, that an opt-complete "demand fix" optimisation process is not detailed in this embodiment.

Conflicts

A conflict (or constraint violation) occurs when a constraint (C'1 or C'2) is violated by the tentative values assigned to relevant decision variables. For example, the solution of the probe generator for the traffic placement problem is a set of tentative values for the $x_{ijk}$ and $y_k$. The tentative assignments of the variables are denoted by $x'_{ijk}$ for $x_{ijk}$, and $y'_k$ for $y_k$. The tentative values are used to compute conflicts (i.e. constraint violations).

A global bandwidth conflict arises if there exists an edge in the network where the global capacity constraint (C'1) is not satisfied. In other words, $$\exists (i,j) \in E \sum_{k \in K} q_k x'_{ijk} y'_k > ub(Globutil) g_{ij}$$

Similarly a sub-pool bandwidth conflict arises if there exists an edge in the network where the sub-pool capacity constraint (C'2) is not satisfied. In other words, $$\exists (i,j) \in E \sum_{k \in K} q_k p_k x'_{ijk} y'_k > ub(Subutil) s_{ij}$$

Note that the upper bounds of the Globutil and Subutil variables are used to compute the conflicts.

If opt-completeness for the demand fix cases is a requirement, a conflict should also arise if constraint (C'6) is violated, i.e. if the sum of the tentative values for the $z_k$ variables is greater than MaxZ. This type of conflict should be repaired by branching on the $z_k$ variables. The opt-completeness requirement for demand fix cases is ignored here for the sake of simplicity.

The Probe Component

The probe component generates tentative paths for all the demands. It does so by identifying a subset of the demands that can be placed differently by a probe generator, and assuming that the paths for the remaining demands remain as they are. As explained it is not necessary to (re-)route all demands at once. In this embodiment it is assumed that the tentative paths can be probe generator deals with single demand probes, i.e. at each search node the probe generator revises the placement of only one demand, and assumes the remainder remain unchanged, without loss of generality. It is also assumed that the probe generator is an MIP algorithm without loss of generality.

Single Demand Probe

If we ignore delay constraints, the single demand probe can be solved as a linear program (LP) or using a specialised shortest path algorithm such as Dijkstra's shortest path algorithm. The complexity of such algorithms is poly-logarithmic. For example, the binary heap version of Dijkstra has complexity $O(|E|\log|N|)$.

The shortest path formulation for a demand k is the following:

Minimize $$\sum_{(i,j)\in E} c_{ij} x_{ijk}$$

Subject to $$\forall i \in N \sum_{(i,j)\in E} x_{ijk} - \sum_{(j,i)\in E} x_{jik} = b_{ik}$$

Where
$b_{ik}=1$, if $i=s_k$
$b_{ik}=-1$, if $i=t_k$
$b_{ik}=0$, otherwise

A solution to this problem generates a tentative path for the demand. That is the values returned for the decision variables are tentatively assigned. If a solution exists then the demand is tentatively placed ($y'_k=1$).

If no solution exists to the shortest path problem for demand k then we can safely set $y_k$ to 0, i.e., the demand cannot be placed on the network.

Note that the LP problem above has the total unimodularity (TU) property. The TU property guarantees that the optimal solution to the LP problem will have an integer optimal solution. Thus, there is no requirement to state that the $x_{ijk}$ variables should be integers.

The selected optimization function minimizes the sumtotal overbooked bandwidth resulting from capacity constraint violations.

Single Demand Probe with Delay Constraints

When delay constraints are taken into account, the relaxed sub-problem becomes non-polynomial. It is no longer a totally unimodular problem. There is, however, an integer programming formulation that is efficient in practice.

Minimize $$\min \sum_{(i,j)\in E} c_{ij} x_{ijk}$$

Subject To $$\forall i \in N \sum_{(i,j)\in E} x_{ijk} - \sum_{(j,i)\in E} x_{jik} = b_{ik}$$

Where
$b_{ik}=1$, if $i=s_k$
$b_{ik}=-1$, if $i=t_k$
$b_{ik}=0$, otherwise $$\sum_{(i,j)\in E} d_{ij} f_k x_{ijk} \le d_k$$

$$\forall (i,j) \in E x_{ijk} \in [0,1]$$

Single Demand Probe with Required Edges

Figure 4:
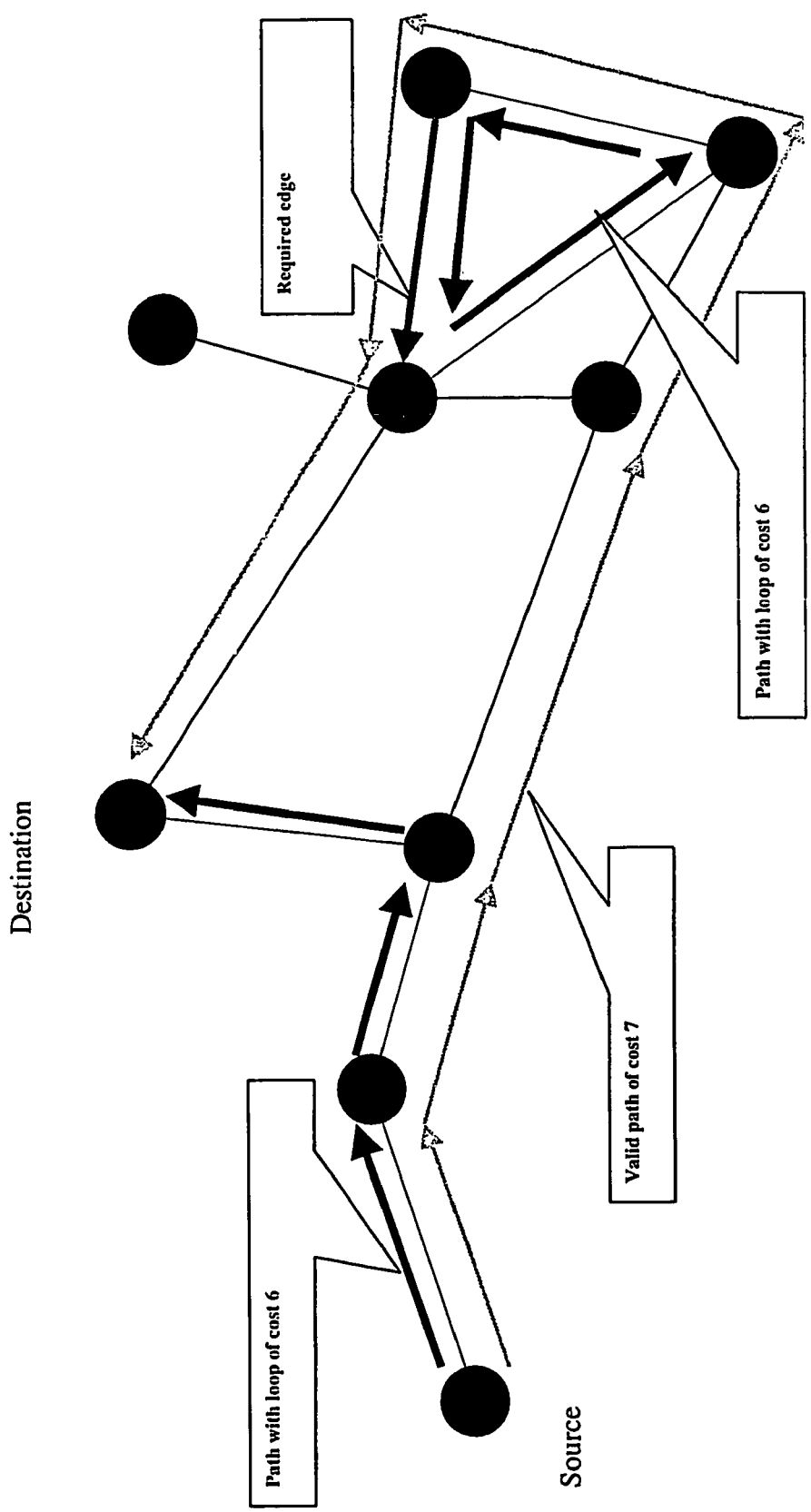
FIG. 4 illustrates a single demand probe with required edges.

In the presence of required edges, the shortest path problem formulation is not powerful enough to guarantee that the solution is the shortest path that contains all required edges. The returned solution can consist of a main path leading from source to destination which does not contain the required edges. Instead, the required edges are included in extra loops not connected to the main path. An example of this is shown in FIG. 4.

Each edge has weight 1. The bold edges are those returned in the solution given by the single demand probe. The required edge is indicated in the Figure in the direction shown by the arrow. The probe's solution (shown by the black arrows) is the minimum weight solution that satisfies the routing problem's constraints and includes the required edge. The shortest valid path including the required edge is shown by the grey arrows. Note that the solution returned has a total weight (6) which is lower than the shortest valid path (7). In this case the returned solution is not a valid path.

In case such a solution is returned, the loop (cyclic path) is detected and extra constraints (cuts) are posted to the MIP shortest path problem to forbid that particular loop.

Suppose the loop consists of $|L_k|$ edges. The cut asserts that the sum of the $x_{ijk}$ variables in the loop is less than or equal to $|L_k|-1$. For each loop $L_k$ in the tentative path $TP_k$ such a cut is asserted. More formally:

$$\forall L_k \in TP_k \sum_{\forall (i,j) \in L_k} x_{ijk} \le |L_k| - 1$$

A second similar cut is posted to forbid the path that did not contain the required edge. Let $TP_k$ be the returned path for demand k containing loops.

$$\sum_{\forall (i,j) \in TP_k} x_{ijk} \le |TP_k| - 1$$

These cuts break the unimodularity property of the formulation (so an LP probe would not necessarily return integers) and so it becomes an Integer Program (IP) where we require that all $x_{ijk}$ variables to be 0-1 variables (this is similar to the case when we solve the probe with delay constraints). The cut-and-IP solve is redone until no loops are returned. The applied IP algorithm is a generic MIP solver with the default settings (e.g. CPLEX). The resulting path is therefore guaranteed to be the shortest path including the required edges.

Comment on Multiple Demand Probe with Delay Constraints

If several demands are rerouted simultaneously by the probe generator the relaxed sub-problem is a form of multi-commodity flow problem with additional side constraints. The techniques given in this application for the single case generalize straightforwardly. Constraints restricting the delay weighted sum of each demand k's $x_{ijk}$ variables to be below the delay threshold are applied wherever delay constraints apply.

Initial Tentative Solution (Initial Probe)

Since in the application described the probe generator does not generate tentative paths for every demand, an initialisation procedure is required to generate initial paths for the demands in the demand admission case (in demand fix, paths already exist for the demands). The probe backtrack search algorithm then incrementally repairs this initial solution.

The initial "wide" relaxation probe to the TP demand admission problem is obtained by applying the probe generator to each demand individually at the start of search.

The Search Component

The search component computes the conflicts involved and heuristically selects the next conflict to repair. It then makes a search decision and applies local consistency procedures to this search decision.

There are two deterministic choices.

1. Selecting the edge (directed link) in conflict (i,j).
    Two types of conflict
        global pool conflict (C'1 violation)

$$\cdot \sum_{k \in K} q_k x'_{ijk} y'_k > ub(Globutil) g_{ij}$$

sub-pool conflict (C'2 violation)

$$\cdot \sum_{k \in K} q_k p_k x'_{ijk} y'_k > ub(Subutil) s_{ij}$$

2. Selecting a demand k contributing to the selected edge with a conflict.
    For global pool conflict
        $x'_{ijk} y'_k \geq 1$
    For sub-pool conflict
        $p_k x'_{ijk} y'_k \geq 1$
    And then there is a non-deterministic (i.e. backtrackable) choice of how to repair the conflict.

3. Choose one of the following:
    Make demand k unplaced (i.e., $y_k=0$) (this choice is not possible in "demand fix cases" where $y_k=1$ for all k)
    Make demand k placed and link (i, j) forbidden for demand k (i.e., $y_k=1$ and $x_{ijk}=0$)
        In this case it is necessary to run a single demand probe for demand k to obtain a new tentative path which does not make use of link (i, j). If no such path exists, backtrack to previous choice point.
    Make demand k placed and link (i, j) required for demand k (i.e., $y_k=1$ and $x_{ijk}=1$)

4. Propagate constraints (apply local consistency procedures until they reach a "fixpoint")
    if infeasibility is detected backtrack to previous choice point.

5. If there are no further conflicts, then terminate with a solution, otherwise repeat this process at the next search node.

The process terminates when all conflicts are removed.

Constraint Propagation (Local Consistency Procedures)

General Propagation

Unless explicitly stated otherwise, Arc-B local consistency procedures apply on all the constraints detailed up to this point, and on the constraint propagation constraints specified below (see O. Lhomme, "Consistency Techniques for Numeric CSPs", In Proceedings of the Thirteenth International Joint Conference on Artificial Intelligence, IJCAI-93, Chambery, France, 1993). Arc-B local consistency procedures also apply to the optimization constraints specified later in the Optimization section.

Lower Bound Propagation

Global Pool Lower Bound Propagation

Let $ga_{ij}$ be the global pool available capacity on link (i,j) defined as follows:

$$\forall (i, j) \in E \; ga_{ij} = ub(Globutil)g_{ij} - \sum_{k \in K} q_k lb(x_{ijk}) lb(y_k)$$

That is $ga_{ij}$ is the best-case available bandwidth on the global pool.

Then $ga_{ij}$ must be non-negative:

$$\forall (i,j) \in E \, ga_{ij} \geq 0$$

Otherwise, it is not possible to repair this constraint violation and a failure should be signaled.

Also, $ga_{ij}$ is used to deduce forbidden links. If a demand not yet placed on the link requires more bandwidth than is available then this link is forbidden for that demand.

$$\forall (i,j) \in E, \forall k \in K var(x_{ijk}) \wedge q_k > ga_{ij} \Rightarrow x_{ijk}=0$$

If a demand is not yet placed, but is known to require that link if placed, and there is not enough bandwidth to place that demand, then the demand cannot be placed.

$$\forall (i,j) \in E, \forall k \in K var(y_k) \wedge x_{ijk}=1 \wedge q_k > ga_{ij} \Rightarrow y_k=0$$

Sub Pool Lower Bound Propagation

Similar reasoning can apply to sub-pools.

Let $sa_{ij}$ be the global pool available capacity on link (i,j) defined as follows:

$$\forall (i, j) \in E \; sa_{ij} = ub(Subutil)s_{ij} - \sum_{k \in K} q_k p_k lb(x_{ijk}) lb(y_k)$$

That is $sa_{ij}$ is the best-case available bandwidth on the sub-pool.

Then $sa_{ij}$ must be non-negative:

$$\forall (i,j) \in E \, sa_{ij} \geq 0$$

Also, $sa_{ij}$ can be used to deduce forbidden links (for sub-pool demands)

$$\forall (i,j) \in E, \forall k \in K var(x_{ijk}) \wedge q_k p_k > sa_{ij} \Rightarrow x_{ijk}=0$$

And to deduce sub-pool demands that cannot be placed.

$$\forall (i,j) \in E, \forall k \in K var(y_k) \wedge x_{ijk}=1 \wedge q_k p_k > sa_{ij} \Rightarrow y_k=0$$

Minimum-Cut-Based Constraints

The application makes use of a maximum flow/min cut algorithm to generate redundant constraints that reduce the size of the search by identifying futile search branches.

DEFINITION OF THE MINIMUM CUT

In a directed graph $G=(N, E)$, a cut $(S, T)$ is defined by a set of edges $(i,j)$ where $i \subset S$ and $j \subset T$ such that if removed from the graph, nodes in S become disconnected from nodes in T.

A minimum cut $(S, T)$ is a cut where the sum of the edge capacities $(u_{ij})$ crossing the cut is minimal:

$$\min \sum_{\forall (i,j) \in (S,T)} u_{ij}$$

According to the Ford-Fulkerson theorem (1956), this minimal cut corresponds to the maximal flow and can be found using a poly-logarithmic complexity algorithm.

Generating Redundant Constraints from the Minimum Cut

A minimum cut algorithm, namely Ford-Fulkerson, is used to generate redundant constraints for the Traffic Placement problem (see L. R. Ford, D. R. Fulkerson, "Maximal flow through a network." Canadian Journal of Mathematics 8, 1956). According to its definition, any cut $(S, T)$ disconnects the nodes in S from the nodes in T. Additionally, the cut size shows how much capacity is available for all the demands from node i to node j where $i \subset S$ and $j \subset T$.

Therefore given a cut $(S, T)$ we can use it to create a redundant constraint for each pool.

$$\sum_{\forall s_k \in S \wedge t_k \in T} q_k y_k \leq \sum_{\forall (i,j) \in (S,T)} ub(Globutil) g_{ij}$$

$$\sum_{\forall s_k \in S \wedge t_k \in T} q_k p_k y_k \leq \sum_{\forall (i,j) \in (S,T)} ub(Subutil) s_{ij}$$

In the embodiment a cut constraint pair is generated for the end points of each demand.

Heuristics

This section concerns the selection of the demand that will be addressed at a particular search node by the probe generator. The heuristics are rules that decide which demand is selected.

Edge Selection Heuristic

Many alternatives exist. In the embodiment, the heuristic used is the largest conflict heuristic, i.e. the largest bandwidth violation. This is described below.

Largest Conflict

This edge selection heuristic first focuses on the subpool conflicts and selects the conflict on the link $(i,j)$ where the value of the conflict is maximal. The value of the conflict is defined as:

$$\left( \sum_{k \in K} q_k p_k x'_{ijk} y'_k \right) - ub(Subutil) s_{ij}$$

If there are no subpool conflicts it inspects the global pool conflicts and selects the maximal value conflict. The conflict value is determined by:

$$\left( \sum_{k \in K} q_k x'_{ijk} y'_k \right) - ub(Globutil) g_{ij}$$

Demand Selection Heuristics

Once a bandwidth violation has been selected for the attempted repair, demand selection heuristics decide which demand among the set of demands causing the violation should be rerouted by the probe generator. The embodiment given here uses the aggregate heuristic.

Aggregate Heuristic

This heuristic effectively selects the smallest demand that removes the conflict. For the sub-pool conflict on link $(i,j)$, the heuristic looks at the effect of removing the demand from the link. The following two measures are used.

$$Pos_k = \max\left[ \left( \left( \sum_{k \in K} q_k p_k x'_{ijk} y'_k \right) - (q_k + ub(Subutil) s_{ij}) \right), 0 \right]$$

$$Neg_k = \max\left[ \left( \left( q_k + ub(Subutil) s_{ij} \right) - \left( \sum_{k \in K} q_k p_k x'_{ijk} y'_k \right) \right), 0 \right]$$

Figure 5:
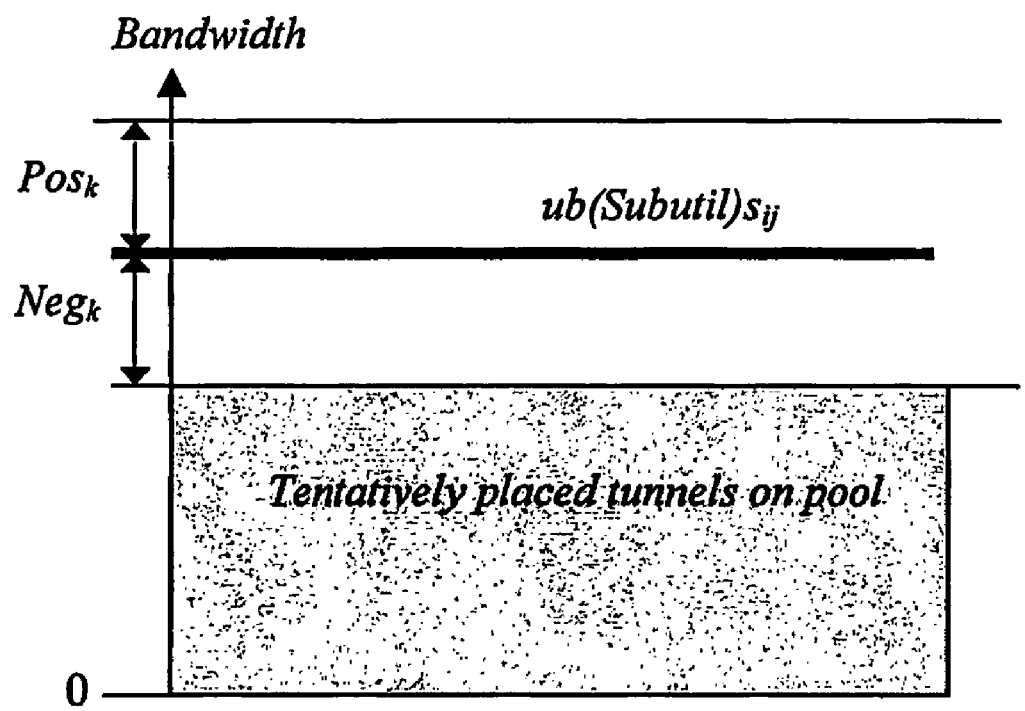
FIG. 5 illustrates the notions of positive and negative bandwidth.

FIG. 5 illustrates the meaning of the $Pos_k$ and $Neg_k$ variables. If moving the demand off the link removes the conflict, then $Pos_k = 0$ while $Neg_k \geq 0$. If moving the demand off the link does not remove the conflict, then $PoS_k > 0$ and $Neg_k = 0$.

The heuristic prefers the demand that has the minimal value of $Pos_k$. If all $Pos_k$ values are equal then the heuristic selects the demand with the minimal value of $Neg_k$.

Optimization

Demand Admission

The optimization process starts search with Subutil and Globutil as continuous variables ranging over interval [0,1]. Thus the upper bound of both variables is 1 initially.

First, the placed demands cost is optimized. When the optimal solution value $v_1^*$ is found, a constraint is posted to make sure that any further solutions will not be any worse.

$$\sum_{k \in K} c_k (1 - y_k) \leq v_1 *$$

The optimal solution found (in terms of placed demand cost) will have a sub-pool utilization $v_2 \leq 1$. Optimization starts with the additional constraint that, Subutil $\leq v_2 - \delta$ where $\delta$ is the improvement factor (default set to 0.001).

Once the optimal value (Subutil*) for sub-pool utilization is found then a constraint is posted to make sure that further solution will not be any worse.

Subutil $\leq$ Subutil*

Again, the optimal solution found (in terms of sub-pool utilization) will have a global pool utilization $v_3 \leq 1$. Optimization starts with the additional constraint that, Globutil $\leq v_3 - \delta$ Note that optimization terminates when the optimal solution for global pool utilization is found (Globutil*).

At this point the solution is hierarchically optimal in the following order of (1) demand placed cost, (2) sub-pool utilization and (3) global pool utilization. Optimality for sub-pool and global pool utilization is guaranteed within δ units of the optimal.

Demand Fix

If implemented, a demand fix optimization process starts search with MaxZ as a continuous variable ranging over interval [0,k].

When a solution value with perturbation p* is found, an additional optimization constraint is posted to restrict the perturbation (i.e. the number of reroutes) to be lower than the perturbation of the latest solution found.

$$MaxZ \leq p^* - 1$$

The optimization progresses until no further solutions are possible, indicating that the last solution found is optimal.

Whilst in the aforementioned embodiments network routing has been described, it is appreciated that the method may be applied alternatively to other related problems, such as network optimisation or more generally multi-commodity flow problems.

Whilst in the aforementioned embodiments mixed integer programming has been used to generate a probe, it is appreciated that alternatively other techniques may be used, such as other techniques based on linear programming, local search techniques, other specialised network flow algorithms, including but not restricted to SPF and CSPF based methods.

Whilst in the above described embodiments traffic engineering using MPLS is described as the network route configuration method, it is appreciated that alternatively other methods can be used.

It is to be understood that the embodiments described above are preferred embodiments only. Namely, various features may be omitted, modified or substituted by equivalents without departing from the scope of the present invention, which is defined in the accompanying claims.

The invention claimed is:

1. A method of selecting and routing traffic flow demands in a communications network, the communications network comprising a plurality of nodes, the nodes being connected to one another by links, the method comprising selecting a subset from a given set of traffic flow demands and calculating at a processor of a network device, a plurality of paths for the selected demands under consideration of a set of constraints using an algorithm hybridization combining backtrack search with local consistency techniques and probe generation and further comprising routing the selected demands via the plurality of paths calculated;
wherein said backtrack search comprises reoptimizing only a portion of a relaxation problem by a probe generator at each of said nodes in said backtrack search, and wherein routing the selected demands comprises routing or rerouting no more than one of said paths at each of said nodes in said backtrack search.

2. The method according to claim 1, wherein the probe generation includes an arbitrary relaxation of said constraints.

3. The method according to claim 2, wherein constraints associated with a demand that is subject to rerouting by the probe generator are satisfied by incrementally adding appropriate cut constraints when performing relaxation of said constraints.

4. The method according to claim 1, wherein the search is directed to search areas in which the probe violates at least one of the constraints.

5. The method according to claim 1, comprising generating probes using an algorithm that incorporates a linear programming solver.

6. The method according to claim 5, comprising generating probes using an algorithm that incorporates a mixed integer programming solver.

7. The method according to claim 1, comprising generating probes using an algorithm that incorporates a local search technique.

8. The method according to claim 1, comprising generating probes using an algorithm that incorporates a shortest path first (SPF) algorithm.

9. The method according to claim 8, comprising generating probes using an algorithm that incorporates a constrained shortest path first (CSPF) algorithm.

10. The method according to claim 1, wherein the method comprises a probe backtrack search technique.

11. The method according to claim 1, wherein the paths are calculated for: i) placement of new paths; ii) placement of new paths in the context of existing paths; iii) re-routing existing paths; or iv) dropping existing paths to enable the admission of new paths.

12. The method according to claim 1, further comprising an optimization technique.

13. A method of selecting and routing traffic flow demands in a communications network, the communications network comprising a plurality of nodes, the nodes being connected to one another by links, the method comprising selecting a subset from a given set of traffic flow demands, and calculating a plurality of paths for the selected demands under consideration of a set of constraints, wherein the method includes performing at a processor of a network device the steps of:
   a) dividing the constraints into "easy constraints" and "hard constraints", wherein said easy constraints comprise a subset of a full set of constraints, and said hard constraints comprise complex constraints that are given as an input to a problem or posed by an optimization procedure;
   b) obtaining a probe satisfying the easy constraints, wherein obtaining a probe satisfying the easy constraints comprises routing said traffic flow demands while ignoring capacity constraints and obtaining a probe individually for each of said traffic flow demands;
   c) determining whether the probe violates one or more of the hard constraints, wherein said hard constraints comprise said capacity constraints; and
   d) starting from the probe, searching for one or more solutions satisfying the hard constraints if the probe is determined to violate hard constraints in step (c);
   and wherein the method employs local consistency techniques.

14. The method according to claim 13, wherein in step (d) a tree structured search is performed.

15. The method according to claim 13, wherein in step (d) a backtrack search is performed.

16. The method according to claim 13, wherein in step (d) at least one of the paths of the probe is changed.

17. The method according to claim 16, wherein in step (d) the changing is achieved by formulating additional constraints and re-applying probing.

18. The method according to claim 13, wherein in step (d), if alternative solutions satisfying the hard constraints exist, a backtrack point is created.

19. The method according to claim 18, further comprising selecting a violated hard constraint for repair at the backtrack point that is a violated link or link bandwidth capacity constraint.

20. The method according to claim 18, wherein the backtrack point is configured so as to provide for one or more of the following choices to be respected in a child node:
   deselecting paths for a demand d causing a capacity violation;
   selecting demand d;
   preventing demand d from traversing a link with an overloaded capacity or capacity pool; or
   forcing demand d to traverse a link with an overloaded capacity or capacity pool.

21. The method according to claim 13, wherein the set of constraints comprises one or more of the following constraint classes:
   capacity constraints,
   delay constraints,
   flow conversion constraints,
   constraints forcing re-routing of paths, and
   min-cut constraints.

22. The method according to claim 13, wherein the local consistency techniques including an Arc-B consistency procedures.

23. The method according to claim 13, wherein the probe is obtained by relaxing the capacity constraints.

24. The method according to claim 13, wherein the probe is obtained by calculating each of said plurality of paths individually or in subsets, while assuming the remainder hold their prior tentative paths.

25. The method according to claim 13, wherein paths are calculated for: i) placement of new paths; ii) placement of new paths in the context of existing paths; iii) re-routing existing paths; or iv) dropping existing paths to enable the admission of new paths.

26. The method according to claim 13, wherein the method further comprises the following step:
   (e) selecting a solution from all solutions obtained in step (d) according to one or more predetermined criteria.

27. The method according to claim 26, wherein in step (e) the solution is selected by minimizing or maximizing an optimization function.

28. The method according to claim 27, wherein the optimization function is hierarchically structured.

29. The method according to claim 27, wherein the optimization function for placement of new user path relates to at least one of the following criteria classes: placed demand penalties or profit; capacity utilization; multiple capacity utilization; or multiple nested capacity utilization.

30. The method according to claim 27, wherein the optimization function for re-routing of existing paths is a measure of perturbation.

31. The method according to claim 27, wherein the optimization function for re-routing of existing paths relates to the number of paths which have to be rerouted.

32. The method according to claim 13, wherein at every search node in the backtrack search only a subset of the paths are re-routed.

33. The method according to claim 13, wherein the calculation of paths includes i) the calculation of primary paths; ii) the calculation of secondary paths; iii) the calculation of fast re-route protection paths; or iv) the calculation of improved paths for a network with existing paths.

34. The method according to claim 13, wherein the search is complete.

35. The method according to claim 13, wherein the search is sat-complete.

36. The method according to claim 13, wherein the search is opt-complete.

37. A method of selecting and routing traffic flow demands in a communications network, the communication network comprising a plurality of nodes, the nodes being connected to one another by links, the method comprising performing at a processor of a network device:
   a) selecting a subset from a given set of traffic flow demands;
   b) calculating a plurality of paths for the selected demands under consideration of a set of constraints, said constraints comprising bandwidth capacity of bandwidth pools associated with said plurality of paths;
   c) obtaining a tentative solution satisfying a subset of the full set of constraints;
   d) determining whether the tentative solution violates the full set of constraints;
   e) starting from the tentative solution, searching for one or more feasible solutions satisfying the full set of constraints if the tentative solution is determined to violate the full set of constraints in step (d); and
   f) placing said traffic flow demands;
   wherein local consistency techniques are applied.

38. A method of selecting and routing traffic flow demands in a communications network, the communications network comprising a plurality of nodes, the nodes being connected to one another by links, the method comprising selecting a subset from a given set of traffic flow demands, and calculating at a processor of a network device a plurality of paths for the selected demands under consideration of a set of constraints using a backtrack search, wherein shortest path first (SPF) or constrained shortest path first (CSPF) are used for obtaining a probe, and wherein local consistency techniques are applied; and
   wherein said backtrack search comprises reoptimizing only a portion of a relaxation problem by a probe generator at each of said nodes in said backtrack search, and wherein routing the selected demands comprises routing or rerouting no more than one of said paths at each of said nodes in said backtrack search.

39. The method according to claim 38, wherein the selected subset of traffic flow demands is a non-strict subset.

40. An apparatus for calculating paths in a communications network, adapted to perform the method of claim 38.

41. A network management system for managing a network and selecting and routing traffic flow demands in the network, the network comprising a plurality of nodes connected to one another by links, the system comprising:
   a processor configured to select a subset from a given set of traffic flow demands and calculate a plurality of paths for the selected demands under consideration of a set of constraints using an algorithm hybridization combining backtrack search with local consistency techniques and probe generation and further configured to route the selected demands via the plurality of paths calculated; and
   memory for storing said set of traffic flow demands;
   wherein said backtrack search comprises reoptimizing only a portion of a relaxation problem by a probe generator at each of said nodes in said backtrack search, and wherein routing the selected demands comprises routing or rerouting no more than one of said paths at each of said nodes in said backtrack search.

42. Apparatus for selecting and routing traffic flow demands in a communications network, the communications network comprising a plurality of nodes, the nodes being connected to one another by links, the apparatus comprising:
   a processor; and memory that stores instructions for execution by the processor, said instructions comprising:

code that selects a subset from a given set of traffic flow demands and calculates a plurality of paths for the selected demands under consideration of a set of constraints using an algorithm hybridization combining backtrack search with local consistency techniques and probe generation; and code that routes the selected demands via the plurality of paths calculated;

wherein said backtrack search comprises reoptimizing only a portion of a relaxation problem by a probe generator at each of said nodes in said backtrack search, and wherein routing the selected demands comprises routing or rerouting no more than one of said paths at each of said nodes in said backtrack search.

43. The method of claim 1 further comprising if one of said plurality of paths violates a capacity constraint on a link pool:

seeking to reduce violations in child search nodes;

constraining a demand to be routed away from one of the links at said node and reducing violations of capacity constraints in child search nodes; or routing said demand through one of the links at the node and seeking an alternative demand to reduce said violation in said child search nodes.

44. The method of claim 1 wherein said set of constraints comprises bandwidth pool capacity and maximum delay constraints.

45. The method of claim 44 wherein said bandwidth pool capacity comprises an original bandwidth pool capacity multiplied by a worst-cast pool utilization variable.

46. The method of claim 13 further comprising routing said traffic flow demand if no hard constraints are violated in step (c).

47. The method of claim 37 wherein said communication network comprises a Multiprotocol Label Switching (MPLS) communication network and each of said links are associated with a sub-pool and a global pool utilization capacity and wherein said bandwidth pool capacity is based on said sub-pool and global pool utilization capacity.

* * * * *